(12) United States Patent
Dootjes et al.

(10) Patent No.: US 7,699,465 B2
(45) Date of Patent: Apr. 20, 2010

(54) CONTACT LENS

(76) Inventors: Rikke Dootjes, 409, 11456 Jasper Avenue, Edmonton, AB (CA) T5K 0M1; William L. Sturm, Suite 101, 15 Everstone Dr. SW, Calgary, AB (CA) T2Y 5B5

(*) Notice: Subject to any disclaimer, the term of this patent is extended or adjusted under 35 U.S.C. 154(b) by 274 days.

(21) Appl. No.: 11/734,701

(22) Filed: Apr. 12, 2007

(65) Prior Publication Data

US 2007/0242216 A1 Oct. 18, 2007

Related U.S. Application Data

(60) Provisional application No. 60/791,524, filed on Apr. 12, 2006.

(51) Int. Cl.
G02C 7/04 (2006.01)
G02C 7/02 (2006.01)
(52) U.S. Cl. .................................. 351/160 R; 351/177
(58) Field of Classification Search ............. 351/160 R, 351/160 H
See application file for complete search history.

(56) References Cited

U.S. PATENT DOCUMENTS

| | | | |
|---|---|---|---|
| 2,264,080 A | 11/1941 | Hunter | |
| 3,212,097 A | 10/1965 | Adler | |
| 3,489,491 A | 1/1970 | Creighton | |
| 3,698,802 A | 10/1972 | Baron | |
| 3,937,566 A | 2/1976 | Townsley | |
| 4,084,890 A | 4/1978 | Baron | |
| 4,157,864 A | 6/1979 | Koller | |
| 4,332,443 A | 6/1982 | Thomas | |
| 4,573,775 A | 3/1986 | Bayshore | |
| 4,640,594 A | 2/1987 | Berger | |
| 4,890,911 A | 1/1990 | Sulc | |
| 5,044,742 A | 9/1991 | Cohen | |
| 5,104,213 A | 4/1992 | Wolfson | |
| 5,141,301 A | 8/1992 | Morstad | |
| 5,160,463 A | 11/1992 | Evans | |
| 5,166,710 A | 11/1992 | Höfer | |
| 5,347,326 A * | 9/1994 | Volk | ........................ 351/160 R |
| 5,502,518 A | 3/1996 | Lieberman | |
| 5,671,038 A | 9/1997 | Porat | |
| 5,880,809 A | 3/1999 | Lieberman | |
| 5,929,968 A | 7/1999 | Cotie | |
| 5,953,098 A | 9/1999 | Lieberman | |
| 6,010,219 A | 1/2000 | Stoyan | |
| 6,206,520 B1 | 3/2001 | Jubin | |
| 6,340,229 B1 | 1/2002 | Lieberman | |
| 6,726,322 B2 | 4/2004 | Andino | |

(Continued)

FOREIGN PATENT DOCUMENTS

JP      405034644 A    2/1993

(Continued)

Primary Examiner—Jordan M. Schwartz
(74) Attorney, Agent, or Firm—Christensen O'Connor Johnson Kindness PLLC

(57) ABSTRACT

A scleral lens has an optical zone, a peripheral zone and a sagittal depth control zone between the optical zone and the peripheral zone. The sagittal depth control zone may be configured to raise the optical zone above the level of a person's eye when the scleral lens is in use and create a tear layer between the optical zone and the person's eye. Tear flow control features are provided in the sagittal depth control zone.

12 Claims, 2 Drawing Sheets

U.S. PATENT DOCUMENTS

| | | |
|---|---|---|
| 6,851,805 B2 | 2/2005 | Blum |
| 6,886,936 B2 | 5/2005 | Marmo |
| 7,021,760 B2 | 4/2006 | Newman |
| 2002/0003605 A1 | 1/2002 | Rogers |
| 2002/0163620 A1 | 11/2002 | Miyamura |
| 2004/0212779 A1 | 10/2004 | Dahi |
| 2005/0146679 A1 | 7/2005 | Marmo |
| 2006/0152673 A1* | 7/2006 | Cotie et al. .......... 351/160 H |
| 2006/0215110 A1 | 9/2006 | Broderick |
| 2006/0290882 A1 | 12/2006 | Meyers |
| 2006/0290883 A1 | 12/2006 | Rosenthal |

FOREIGN PATENT DOCUMENTS

| | | |
|---|---|---|
| JP | 409218382 A | 8/1997 |

* cited by examiner

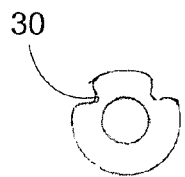
FIG. 3A
FIG. 3B
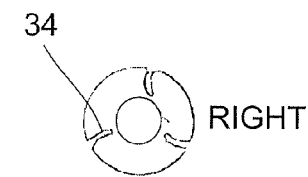
FIG. 3C
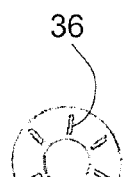
FIG. 3E
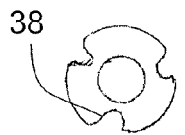
FIG. 3F
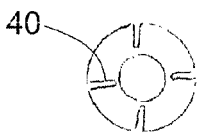
FIG. 3G
FIG. 3D
FIG. 3K
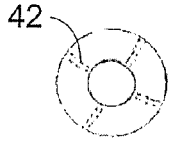
FIG. 3H
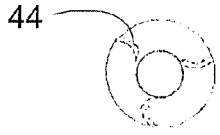
FIG. 3I
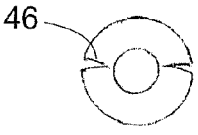
FIG. 3J
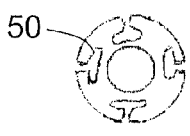
FIG. 3L
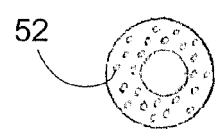
FIG. 3M
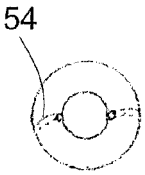
FIG. 3N

CONTACT LENS

This application claims the benefit under 35 USC 119(e) of U.S. Provisional Application No. 60/791,524 filed Apr. 12, 2006.

BACKGROUND

The front surface of the eye comprises the cornea at the center, the sclera, which is white and surrounds the cornea, and the limbus, which provides the boundary between the cornea and the sclera. For many years, contact lenses were made that covered the cornea, with little overlap onto the sclera. These lenses could be rigid or soft. Rigid lenses provide advantages over soft lenses, such as superior sagital depth control, shape maintenance, and ability to work with problematic eyes, but rigid lenses are generally less comfortable. Hence, soft lenses have become more popular. More recently, rigid lenses have been made of a much higher oxygen permeable materials and have been made sufficiently large to extend some distance beyond the limbus onto the sclera, while maintaining the advantages of rigid lenses. However, such lenses suffer from a difficulty in that they tend to gradually accumulate debris under the lens, become adhered and uncomfortable and cannot be worn comfortably for a long time.

SUMMARY

In one embodiment, there is provided a scleral lens having an optical zone, a peripheral zone and a sagittal depth control zone between the optical zone and the peripheral zone. The sagittal depth control zone may be configured to raise the optical zone above the level of a person's eye when the scleral lens is in use and create a tear layer between the optical zone and the person's eye. Tear flow control features are provided in the sagittal depth control zone.

In another embodiment, a scleral lens has an optical zone and at least one zone radially outward from the optical zone. Tear flow control features are provided in the at least one zone. The tear flow control features may comprise elongated slots forming ports that penetrate through the material of the lens. The elongated slots may be oriented to slant nasally as the elongated slots extend radially outward.

In another embodiment, there is provided a method of applying a lens to a person's eye. The steps include forming a lens of suitable size to fit a person's eye and providing the lens with an optical zone, a peripheral zone and a sagittal depth control zone between the optical zone and the peripheral zone. The sagittal depth control zone may be configured to raise the optical zone above the level of a person's eye when the scleral lens is in use and create a precisely measurable tear layer between the optical zone and the person's eye. The lens may be provided with tear flow control features in the sagittal depth control zone.

BRIEF DESCRIPTION OF THE FIGURES

A new lens is described with reference to the figures, which show embodiments of a lens that control tear flow, including:

FIG. 3A: lens with two cut-outs with depths up to or over the limbus to outer edge;

FIG. 3B, C, D: lens with curved, clockwise or counter-clockwise, or spiral grooves;

FIG. 3E: straight grooves or cut-outs with intact periphery;

FIG. 3F: as with FIG. 3A, but shows additional cut-outs;

FIG. 3G: grooves from the edge up to and past the limbus;

FIGS. 3H, 3I: grooves not cut through provide channels or flutes for tear flow;

FIG. 3J: grooves in from the edge with varying width;

FIG. 3K: grooves cut in circumferential direction;

FIG. 3L: grooves or cut-outs expand in width towards the center to form interior lacunae;

FIG. 3M: openings passing through the lens near the limbus or having diameter greater than 2 mm; and FIG. 3N: openings connected to flutes or channels that are not cut through and extend radially.

DETAILED DESCRIPTION

A scleral lens begins with a large diameter contact lens blank which is lathe cut, spincast or moulded into a large diameter gas permeable contact lens to fit over at leas t a part of the sclera of a person's eye—the sclera being what is commonly known as the white part of the eye. This large diameter scleral lens clears the limbus of the eye—it does not touch the limbus but extends beyond the limbus of the eye—as the lens attaches to or rests upon the sclera of the eye while it is worn on the eye. The lens may be made of a rigid oxygen permeable material such as is available from various manufacturers of contact lens blanks.

Figure 1:
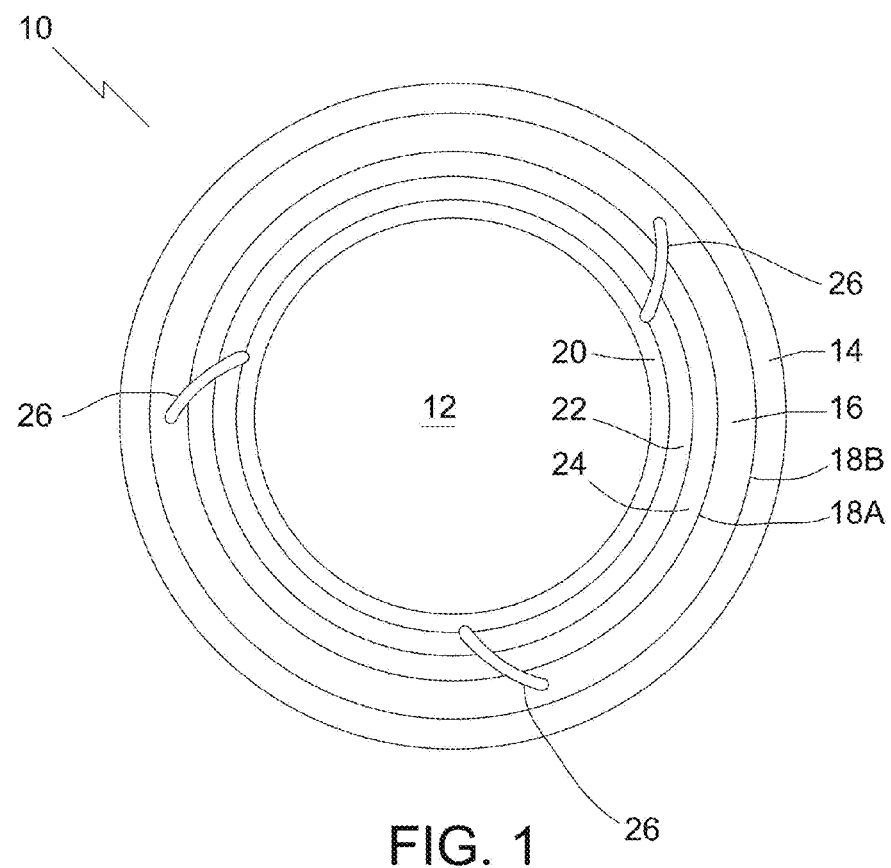
FIG. 1, which shows a plan view of a lens.
Figure 2:
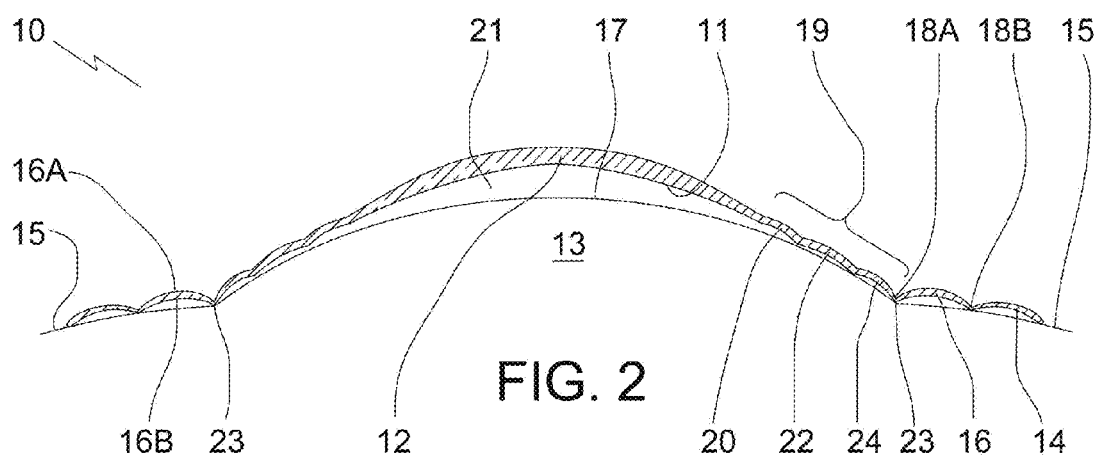
FIG. 2, which shows a section across a diameter of the lens of FIG. 1.

Referring to FIGS. 1 and 2, an embodiment 10 of a scleral lens has plural concentric zones. In the center of the lens 10 is the optical zone 12, which typically has a diameter of about 6-9 mm. The optical zone has a front or anterior face with a radius of curvature, and a rear or posterior face 11 with a base curve radius that is selected, in relation to the radius of curvature of the front face, to provide a desired optical enhancement to the wearer. The optical zone 12 is configured to include optical control features to correct the vision of the person on whom the lens is to be fitted. These optical control features may for example include spherical portions of varying radius of curvature, aspherical portions and torroidal portions. The optical zone 12, when thus configured, will have a specific shape in relation to a person's eye 13.

At the outside of the lens 10, there is a peripheral zone 14, which may have for example a total width of 0.1 to 2 mm, for example 1 mm. The peripheral zone 14 may comprise of one or more curves and may have varying contour to conform to the shape of the scleral portion 15 of a person's eye 13 and for that purpose may be spherical or aspherical. Radially inside of the peripheral zone 14, is a reverse curvature zone 16. A reverse curvature zone is a zone having a radius of curvature smaller than the radius of curvature of a zone interior to the reverse curvature zone. In addition, at the reverse curvature zone 16, the front or posterior face 16A of the zone 16 has a radius of curvature that is smaller than the radius of curvature of the rear or anterior face 16B of the zone 16. The relative curvatures of the front and back of the zone 16 create hinge areas 18A, 18B on each side of the zone 16. The zone 16 may be for example 0.1 to 3 mm in radial width and may for example be about 1 mm in width.

Inside of the zone 16 and outside of the optical zone 12 is a sagittal depth control zone 19 that in one embodiment comprises one or more zones that may have different radius of curvature from the base curve of the optical zone 12. The sagittal depth control zone is designed, for a specific person's eye, given the shape of the optical zone 12 of the lens designed for that person, to lift the optical zone 12 off the person's eye, above the cornea 17, including above the optical apex, and create a space under the optical zone 12 in which a tear layer 21 may form. When the tear layer contacts both the cornea 17 and the rear surface of the optical zone 12, a tear lens forms. The sagittal depth, which is the distance between the rear face of the optical zone 12 and the cornea 17, should be precisely controlled to permit tear flow under the lens 10. If the sagittal depth is too low, tears will not flow due to viscous drag on the tear fluid from the cornea 17 and lens 10. If the sagittal depth is too high, no tear lens will form. As an example, a satisfactory tear layer would be from 20 µm to 150 µm or from 50 µm up to 150 µm in average thickness. The tear layer thickness will not usually be uniform but will vary due to the structure of the eye to which the lens is applied, and will typically be lowest over the optical apex.

The sagittal depth control zone 19 is selected to extend, in use when applied to a person's eye, mainly across the cornea and to come close to, or reach or slightly exceed the limbus 23, while at least the peripheral zone 14 and part or all of the reverse curvature zone 16 extend over the scleral portion 15 of the eye. The zones in the sagittal depth control zone may each have a posterior radius of curvature that is equal to the anterior radius of curvature of that zone (that is, their rear and front surfaces may be parallel to each other).

The sagittal depth control zone 19 may in some embodiments be formed from three zones as for example illustrated in FIGS. 1 and 2, and may include one or more reverse curvature zones including a zone such as the zone 16. Immediately outside of the optical zone 12 is a narrow zone 20 having a radius of curvature, both front and rear, that is close to or the same as the base curve radius. The zone 20 may extend outward from the optical zone 12 approximately 0.1 to 2 mm such as 0.5 mm. Immediately outside of the zone 20, may be a further narrow zone 22, also of outward extension from the zone 20 about 0.1 to 2 mm, and having a radius of curvature, both front and rear, that is close to or the same as the base curve radius. Immediately outside of the zone 22 is a zone 24, that may for example have a radius of curvature of about 9 mm. The zone 24 may have dimensions of 0.1 to 2 mm, for example 0.6 mm. The sagittal depth control zone 19 may be formed from a variety of structures, and may have varying width depending on the eye to which the lens 10 is to be applied and the extent of lifting of the optical zone 12 from the eye that is desired. The sagittal depth control zone 19 may comprise one zone or as many zones as can practicably be made. By using more than one zone for the sagittal depth control zone 19, the lens 10 can be made to conform to a desired contour across the surface of the person's eye 13 to which the lens 10 is to be applied. The zones of the sagittal depth control zone 19 may for example be spherical, aspherical or torroidal.

A correct sagittal depth enables a patient to see properly with any rigid lens. If the sagittal depth is too high there is no tear lens and a patient will not be able to obtain good vision. When sagittal depth is too low it creates not only improper visual acuity but the rubbing of the lens on the cornea may create a deterioration of the epithelium and may create scarring, limiting visual acuityeven more. By using a sagittal depth control zone, the sagittal depth may be changed without altering the features of the optical zone 12. By choice of the radii of the zones in the sagittal depth control zone 19, including use of spherical or aspherical zones, with for example one or more reverse curves, the sagittal depth can be controlled to a precise height and thus precisely control the tear layer thickness. Precise tear layer thickness allows the tear pump to work most efficiently, reduces adhesion, and reduces complexity of the trial and error fitting.

As shown in FIG. 1, the scleral lens 10 may have one or more ports 26 that penetrate the scleral lens 10, beyond the optical zone, and radially inside the peripheral zone 14. The ports 26 are located in some embodiments in the sagittal depth control zone and may extend into the reverse curvature zone 16. The ports 26 may have varying shape and size, as for example the ports may be 0.02-0.4 mm wide, and 2-5 mm long. The ports 26 may be curved along their length. In the example of FIG. 1, the lens 10 may be for the right eye of a person. The ports 26 are oriented in the example of FIG. 1 to slant and bend to the left (nasal direction) the further outward from the optical zone 12. This gives the ports 26 a spiral configuration. Ports in a lens of like nature made for a left eye would in this example slant and bend to the right (nasal direction for left lens).

The sagittal depth control zone 19 and reverse curvature zone 16 control the thickness of a tear layer. The thickness of the tear layer is chosen to provide an optimum inner lens for a smooth refracting surface between the irregular cornea 17 of a person's eye 13 and the posterior surface 11 of the lens. The tear layer also provides a tear reservoir that provides a source of tear flow through the ports 26. The hinges 18A, 18B also assist in creating tear flow. Normal lid pressure during blinking pushes the lens 10 closer to the cornea, thus placing pressure on the tear layer. Tear fluid is pushed out of the ports 26 due to the pressure on the tear layer. Due to the nasal orientation of the ports, the tear flow through the ports 26 provides a turning force tending to cause the lens 10 to rotate on the eye clockwise as shown in FIG. 1, or counter clockwise for the right eye. The hinges 18 assist in promoting tear flow since the hinges 18A, 18B allow more flex of the GP hard lens towards and away from the eye, and therefore provide a greater pumping action.

An embodiment of a hard scleral lens, having a sagittal depth control zone 19 formed of at least one zone having a different radius of curvature different from the radius of curvature of the posterior surface 11 of the optical zone 12 of the lens 10, may in certain embodiments include other tear flow control features such as cut-outs, grooves, flutes, channels, openings near the limbus, multiple patterned large openings or notches in the part of the lens that lies over the sclera. The tear flow control features may have varying width, depth, direction, diameter, and length and may be located at or near the limbus and extend to the outer periphery of the lens. Care must be taken not to weaken the lens with too many tear flow control features.

Examples are shown in the figures, in which FIG. 3A shows a lens with two cut-outs 30 with depths up to or over the limbus to outer edge; FIG. 3B, C, show lenses with curved, clockwise or counterclockwise, or spiral grooves 32, 34; FIG. 3E shows straight grooves or cut-outs 36 with intact periphery; FIG. 3F, as with FIG. 3A, but shows additional cut-outs 38; FIG. 3G shows grooves 40 from the edge up to and past the limbus; FIGS. 3H, 3I show grooves 42, 44 not cut through provide channels or flutes for tear flow; FIG. 3J shows grooves 46 in from the edge with varying width; FIG. 3K shows grooves 48 cut in circumferential direction; FIG. 3L shows grooves or cut-outs 50 that expand in width towards the center to form interior lacunae; FIG. 3M shows openings 52 passing through the lens near the limbus or having diameter greater than 2 mm; and FIG. 3N shows openings 54 connected to flutes or channels that are not cut through and extend radially.

These tear flow control features in the otherwise regular disc or bowl shape of a contact lens 10 have the effect of causing the eye on which the lens is fitted to continuously perform a tear flushing action which removes natural debris and naturally occurring bubbles that would otherwise collect and be trapped between the lens 10 and the eye 13 when fitted with a large diameter sclera lens. When a person wearing the lens blinks, the tears and debris cleared from the eye by the tears are swept away from the lens.

In short the tear flow control features act as a naturally occurring tear pump for the eye 13 and the tears are pumped through the space between the eye and the lens. The tear flow control features of the lens do not cause the eyes to tear more than without the lens, but the features channel the normally occurring tears in the eye to come into contact with and to flow in and out of the part of the eye that is covered by the lens. The normally limited space between the eye and the lens which has always trapped irritants for lens wearers is now, with the tear flow control lens, continuously cleaned and lubricated with the natural body fluid known as tears.

This tear flow action makes the lens 10 more comfortable to wear both in the short term and in the long term. It is also noteworthy to stress that the lens 10, because of the natural flowing tears that occur uninterrupted, is able to provide a consistent vision correction with comfort and without the steady decline that other larger lenses experience after they are fitted and as they approach the time when they must be removed cleaned and or replaced. An additional advantage is that when the eye experiences a natural comfort with the continuous flow of tears there is no need to remove the lens to relieve eye fatigue as the wearer of other contact lenses must do to ensure that they do not do harm to heir eyes.

The large diameter sclera contact lenses or speciality lenses that are commonly used today for problem eyes offer an improvement for the lens wearer's comfort and vision correction. However in tests performed by the inventors the performance of a large diameter sclera lens that is modified to become a tear flow control lens (with the novel tear flow control features) the vision correction and comfort for the lens wearer is markedly increased because of the tear pump action that naturally occurs as the lens is fitted and that continues to occur naturally uninterrupted as the lens is worn.

The novel tear control features may be applied to any lens that fits at least in part over the sclera of the eye.

What is claimed is:

1. A contact lens, comprising:
   material forming a lens of suitable size to fit a person's eye and extend over at least a portion of the sclera of the person's eye;
   the lens having an optical zone, a peripheral zone and a sagittal depth control zone between the optical zone and the peripheral zone;
   the sagittal depth control zone being configured to raise the optical zone above the level of a person's eye when the lens is in use and create a tear layer between the optical zone and the person's eye; and
   tear flow control features in the sagittal depth control zone, the tear flow control features comprising ports that penetrate through the material of the lens, the ports being elongated to form slots, and the slots being oriented to slant nasally as the slots extend radially outward.

2. The contact lens of claim 1 in which the ports consist of three ports.

3. The contact lens of claim 1 further comprising a hinge in the lens material, the hinge being located radially outward from the sagittal depth control zone.

4. The contact lens of claim 3 in which the hinge is formed by a zone having an anterior radius of curvature smaller than its posterior radius of curvature.

5. The contact lens of claim 1 in which:
   the optical zone has a posterior surface with a base radius of curvature; and
   the sagittal depth control zone comprises a zone having a radius or radii of curvature different from the base radius of curvature.

6. The contact lens of claim 5 in which the sagittal depth control zone comprises plural zones.

7. A contact lens, comprising:
   material forming a lens of suitable size to fit a person's eye and extend over at least a portion of the sclera of the person's eye;
   the lens having an optical zone and at least one zone radially outward from the optical zone;
   tear flow control features in the at least one zone, the tear flow control features comprising elongated slots forming ports that penetrate through the material of the lens, the elongated slots being oriented to slant nasally as the elongated slots extend radially outward; and
   a hinge in the lens material, at least a portion of the hinge being located radially outward from the elongated slots.

8. The contact lens of claim 7 in which the ports consist of two to six ports.

9. A method of forming a contact lens for application to a person's eye comprising the steps of:
   forming a lens of suitable size to fit a person's eye and extend over at least a portion of the sclera of the person's eye;
   providing the lens with an optical zone, a peripheral zone and a sagittal depth control zone between the optical zone and the peripheral zone;
   the sagittal depth control zone being configured to raise the optical zone above the level of a person's eye when the lens is in use and create a tear layer between the optical zone and the person's eye; and
   providing the lens with tear flow control features in the sagittal depth control zone, the tear flow control features being formed as ports that penetrate through the material of the lens, the ports being formed as elongated slots, the slots being oriented to slant nasally as the slots extend radially outward.

10. The method of claim 9 further comprising forming a hinge in the lens material, the hinge being located radially outward from the sagittal depth control zone.

11. The method of claim 9 in which:
    the optical zone is provided with a posterior surface with a base radius of curvature; and
    the sagittal depth control zone is provided at least by a zone having a radius of curvature different from the base radius of curvature.

12. The method of claim 11 in which the sagittal depth control zone comprises plural zones.

* * * * *